(12) United States Patent
Surawski

(10) Patent No.: US 7,509,968 B2
(45) Date of Patent: Mar. 31, 2009

(54) FLOW CONTROL FOR ON-BOARD INERT GAS GENERATION SYSTEM

(75) Inventor: Eric Surawski, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 264 days.

(21) Appl. No.: 10/901,468

(22) Filed: Jul. 28, 2004

(65) Prior Publication Data

US 2006/0021652 A1 Feb. 2, 2006

(51) Int. Cl.
*B65B 1/04* (2006.01)

(52) U.S. Cl. .......................................... 137/209; 137/2

(58) Field of Classification Search ................ 137/209, 137/2, 206; 220/88.3; 244/135 R
See application file for complete search history.

(56) References Cited

U.S. PATENT DOCUMENTS

| | | | |
|---|---|---|---|
| 3,847,298 A * | 11/1974 | Hamilton ................... 220/88.3 |
| 4,378,920 A | 4/1983 | Runnels et al. |
| 4,556,180 A * | 12/1985 | Manatt ................... 244/135 R |
| 4,681,602 A | 7/1987 | Glenn et al. |
| 4,795,090 A * | 1/1989 | Koukal et al. ............... 236/49.4 |
| 5,069,692 A * | 12/1991 | Grennan et al. ................... 96/4 |
| 5,131,225 A * | 7/1992 | Roettger ..................... 60/785 |
| 6,314,754 B1 | 11/2001 | Kotliar |
| 6,401,487 B1 | 6/2002 | Kotliar |
| 6,418,752 B2 | 7/2002 | Kotliar |
| 6,502,421 B2 | 1/2003 | Kotliar |
| 6,557,374 B2 | 5/2003 | Kotliar |
| 6,560,991 B1 | 5/2003 | Kotliar |
| 6,585,192 B2 * | 7/2003 | Beers ...................... 244/135 R |
| 6,634,598 B2 * | 10/2003 | Susko ...................... 244/135 R |
| 6,729,359 B2 | 5/2004 | Jones |
| 6,739,359 B2 * | 5/2004 | Jones et al. ................... 141/64 |
| 6,904,930 B2 * | 6/2005 | Susko ........................ 137/209 |
| 7,013,905 B2 * | 3/2006 | Jones et al. ................... 137/12 |
| 7,081,153 B2 | 7/2006 | Leigh et al. |
| 2003/0116679 A1 * | 6/2003 | Susko ...................... 244/135 R |
| 2004/0035461 A1 | 2/2004 | Susko |
| 2004/0065778 A1 | 4/2004 | Jones |

FOREIGN PATENT DOCUMENTS

| | | |
|---|---|---|
| WO | WO 00/00389 | 1/2000 |
| WO | WO 02/28714 | 4/2002 |

OTHER PUBLICATIONS

International Search Report dated Mar. 29, 2006.

* cited by examiner

*Primary Examiner*—Eric Keasel
*Assistant Examiner*—Craig M Schneider
(74) *Attorney, Agent, or Firm*—Carlson, Gaskey & Olds

(57) ABSTRACT

An on-board inert gas generating system includes a flow control valve modulated according to changes in ambient conditions to minimize changes to oxygen content within a fuel tank. The quality of the nitrogen-enriched air stream that is provided by the air separation module varies in response to flow. Higher flow rates through the air separation module removes less oxygen relative to lower flow rates. The amount of flow through the air separation module that produces the least amount of oxygen within the fuel tank is determined for an ambient pressure and provided by modulating the flow control valve.

13 Claims, 2 Drawing Sheets

FLOW CONTROL FOR ON-BOARD INERT GAS GENERATION SYSTEM

BACKGROUND OF THE INVENTION

This invention relates to a fuel tank inerting system, and more particularly to a process and device for controlling oxygen content within a fuel tank.

An aircraft fuel tank includes a liquid fuel filled portion and a fuel vapor filled portion known as the fuel tank ullage. Oxygen mixed with the fuel vapor within the ullage creates a potentially hazardous condition. Systems that replace oxygen-containing air with an inert gas substantially reduce the risks of this potentially hazardous condition. Some systems utilize tanks of nitrogen rich air for replacing the oxygen containing air within the fuel tank ullage. An on-board inert gas generating system that replaces oxygen rich air with nitrogen-enriched air is currently under development for use in aircraft.

On-board inert gas generating systems utilize an air separation module that removes oxygen to produce a nitrogen-enriched air stream that fills the fuel tank ullage. Typically the fuel tank is vented to the ambient environment and experiences changes in pressure responsive to changes in altitude. Changes in ambient pressure affect the performance of the air separation module and the rate of flow of nitrogen-enriched air into the fuel tank ullage. Such changes in the rate of flow of nitrogen-enriched air result in a change in the amount of oxygen within the fuel tank.

Current systems utilize fixed flow orifices to control nitrogen-enriched airflow through the air separation module. A high flow orifice is utilized at high pressures, and lower altitudes, and a low flow orifice is utilized during all other conditions. The fixed orifices used to control flow of nitrogen-enriched air are not adaptable and cannot provide a variable flow rate in response to ambient conditions. Disadvantageously, the use of fixed orifices can result in more oxygen than desired within the fuel tank under certain conditions.

Further, the use of fixed orifices require a greater capacity air separation module to accommodate higher pressures at lower altitudes. It is therefore desirable to develop an on-board inert gas generating system that is adaptable to differing environmental conditions to minimize oxygen content within fuel tank ullage.

SUMMARY OF THE INVENTION

An on-board inert gas generating system includes a flow control valve modulated according to changes in ambient conditions to minimize changes to oxygen content with a fuel tank.

The example on-board inert gas generating system includes an air separation module that removes oxygen from an air stream and supplies a nitrogen-enriched air stream to the fuel tank. The removed oxygen is exhausted overboard. In a fuel tank vented to the ambient environment, pressure and temperature within the fuel tank change with ambient conditions. The quality of the nitrogen-enriched air stream provided by the air separation module varies with the ambient conditions. Higher flow rates through the air separation module removes less oxygen relative to lower flow rates.

The variations in pressure and temperature of the fuel tank ullage varies responsive to altitude causes variation in the flow rate through the air separation module that in turn affect the overall amount of oxygen within the nitrogen-enriched air stream that is provided to the fuel tank ullage.

The amount of flow through the air separation module that produces least amount of oxygen within the nitrogen-enriched air stream is determined and a flow control valve modulated to provide the determined flow rate. The flow control valve is operated by an electronic controller to provide a desired flow rate through the air separation module that produces the smallest change in oxygen content within the fuel tank ullage.

These and other features of the present invention can be best understood from the following specification and drawing, the following of which is a brief description.

DETAILED DESCRIPTION OF THE PREFERRED EMBODIMENT

Figure 1:
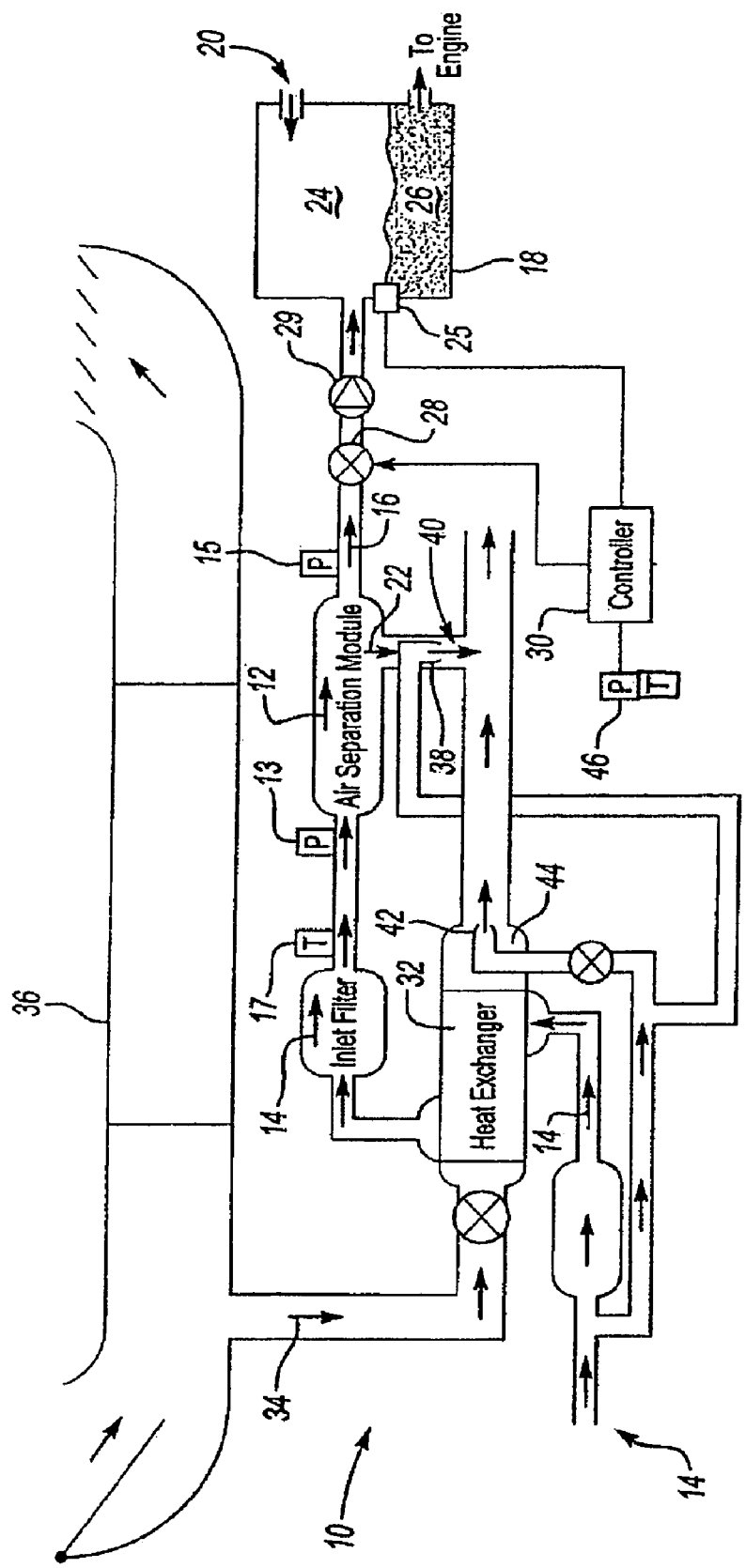
FIG. 1 is schematic view of an on-board inert gas generating system.

Referring to FIG. 1, an example of an on-board inert gas generating system (OBIGGS) 10 is shown and includes an air separation module 12 that removes oxygen from manifold bleed airflow 14. The air separation module 12 removes oxygen from the high pressure air stream 14 and supplies a nitrogen-enriched air stream 16 to a fuel tank 18. An oxygen stream 22 from the air separation module 12 is exhausted overboard. The example fuel tank 18 includes a vent 20 to the ambient environment. The vent 20 causes changes in pressure and temperature within the fuel tank 18 responsive to changes in ambient conditions.

The system 10 includes a heat exchanger 32 provided to regulate the temperature of the high pressure air stream 14. The example heat exchanger 32 exchanges heat between the bleed airflow 14 and ram airflow 34 drawn from a ram air passage 36. The ram airflow 34 moves at a relatively high flow rate as compared to the bleed airflow 14. The high flow rate of the ram airflow 34 is utilized to draw air through the heat exchanger 32 and through the air separation module 12.

An ejector 38 communicates high pressure airflow to produce a low-pressure region at an outlet 40 of the air separation module 12. The low-pressure region is produced by the relatively high flow of the high pressure airflow 34 at the outlet 40 and produces the required pressure drop that draws bleed airflow 14 through the air separation module 12. A second nozzle 42 produces a low-pressure region adjacent an outlet 44 of the heat exchange 32. The low pressure produced by the relative high flow of the high pressure airflow 34 produces the pressure drop that drives airflow through the heat exchanger 32. The mechanism that drives airflow through the air separation module 12 and heat exchanger 32 is known, and a worker versed in the art would understand that other methods and systems for driving airflow are within the contemplation of this invention.

The quality of the nitrogen-enriched air stream 16 provided by the air separation module 12 varies given ambient conditions, and a rate of flow. Higher flow rates through the air separation module 12 remove less oxygen relative to lower flow rates. The pressure and temperature within the fuel tank ullage 24 varies responsive to changes in ambient conditions due to communication with ambient conditions through the vent 20. At higher altitudes, the pressure within the fuel tank 18 is at a low level. During descent, ambient pressure, and therefore pressure within the fuel tank 18 increases. The flow rate through the air separation module 12 varies responsive to these changes in ambient conditions affecting the overall amount of oxygen within the nitrogen-enriched air stream 16 that is provided to the fuel tank ullage 24.

The amount of flow through the air separation module 12 that produces the optimal, or least amount of oxygen within the fuel tank ullage 24 is determined and controlled by modulating a flow control valve 28. A backflow prevention valve 29 is provided downstream of the flow control valve 28 to prevent back flow from the fuel tank 18.

A first sensor 46 provides pressure and temperature information to the controller 30. A second sensor 25 provides information to the controller 30 indicative of conditions within the fuel tank 18. The controller 30 in turn modulates the flow control valve 28 to provide a flow rate of the nitrogen-enriched air stream 16 through the air separation module 12 that results in the least amount of oxygen within the fuel tank ullage 24. An inlet pressure sensor 13 and an outlet pressure sensor 15 provide information on pressure into and out of the air separation module 12. A temperature sensor 17 provides information on the temperature of the bleed airflow 14. The volume and rate of airflow through the air separation module 12 is limited. Therefore, the controller 30 modulates the flow control valve 28 to provide a flow rate through the air separation module 12 that produces the smallest change in oxygen content within the fuel tank ullage 24.

Figure 2:
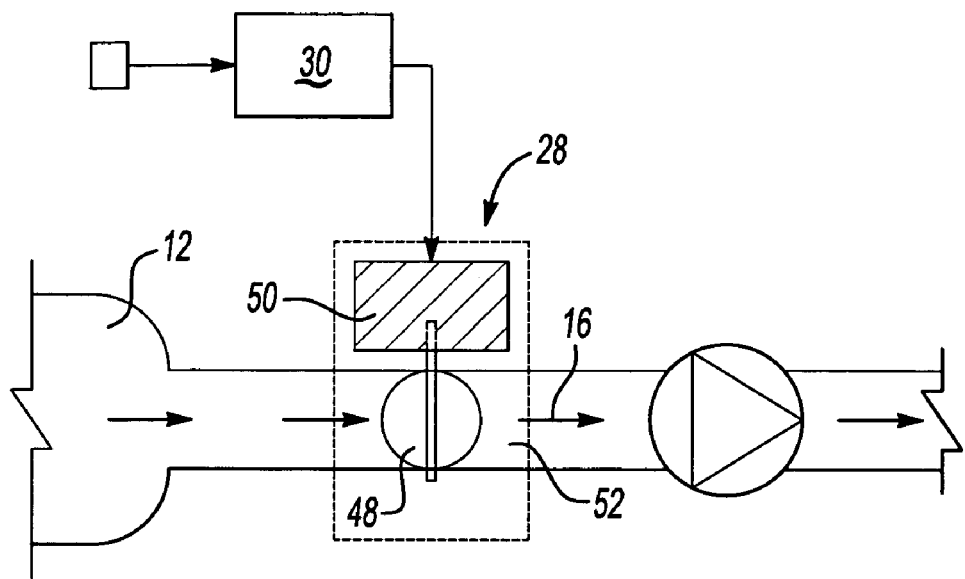
FIG. 2 is a schematic view of an example flow control valve.
Figure 3:
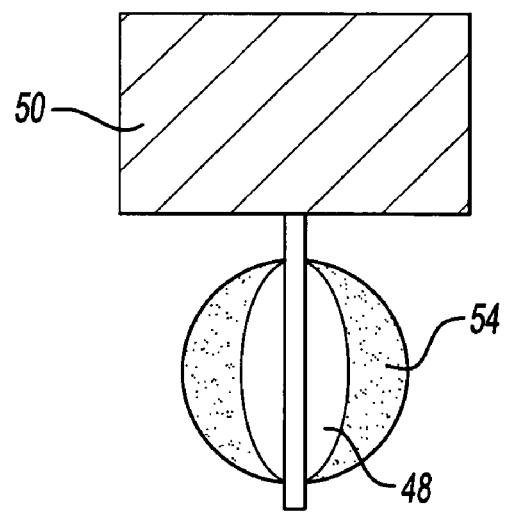
FIG. 3 is another schematic view of the example flow control valve.

Referring to FIGS. 2 and 3, the example flow control valve 28 is shown schematically and includes a valve plate 48 that is rotated by a motor 50. The example motor 50 is a torque motor commanded by the controller 30. The motor 50 opens and closes the flow passage 52 to control the nitrogen-enriched air stream 16. The valve plate 48 can be opened and closed to provide a continuously variable opening 54 that provides control over the nitrogen-enriched air stream 16. Although an example flow control valve 28 is described, a worker versed in the art with the benefit of this disclosure that any valve providing for the control of airflow is within the contemplation of this invention.

The controller 30 can be a commercially available microprocessor as known in the art. A worker versed in the art with the benefit of this disclosure would understand how to program a commercially available microprocessor to command the flow control valve 28.

Referring to FIG. 1, pressure within the fuel tank ullage 24 changes responsive to ambient pressures. The pressure inside the fuel tank 18 at any given point during descent is substantially equal to ambient pressure. The pressure inside the fuel tank 18 during descent can be represented by the equation:

$$P = \int \frac{(Win - Wout) * \gamma * T * R}{Vol} dt. \qquad \text{Equation 1}$$

Where Win and Wout are flow rates into and out of the fuel tank 18. Vol is the volume being inerted, γ is the ratio of specific heats at constant pressure and constant volume, T is the temperature within the fuel tank ullage 24 in degrees Rankin, and R is the ideal gas constant. During descent air is only flowing into the fuel tank 18 and not exiting. For this reason the change in ullage pressure within the fuel tank 18 is equal to the rate of change in ambient pressure, and is represented by equation 2.

$$P = \frac{W * \gamma * T * R}{Vol}. \qquad \text{Equation 2}$$

The controller 30 utilizes information concerning the change in ambient conditions to determine the proper commands for the flow control valve 28. This is determined by first determining the flow of gas into the fuel tank 18 that produces the ambient pressure. Equation 3 below provides the flow rate of gas into the fuel tank 18 that is required to maintain ambient pressure inside the fuel tank 18.

$$Win = \frac{P * (VOL)}{\gamma * T * R}. \qquad \text{Equation 3}$$

The air separation module 12 is of a limited capacity and cannot under all conditions provide the required flow rate of nitrogen-enriched air stream 16 that maintains ambient pressure within the fuel tank 18. Accordingly, a portion of the airflow entering the fuel tank 18 will be through the vent 20. Airflow through the vent 20 includes a quantity of oxygen greater than the nitrogen-enriched air stream 16.

The example system 10 of this invention minimizes oxygen concentration within the fuel tank ullage 24 by continuously adjusting the flow control valve 28 to provide the optimal airflow through the air separation module 12 that will produce the smallest amount of oxygen content within the fuel tank ullage 24 for the given condition. The change in oxygen concentration in the fuel tank 18 is represented by equation 4 below.

$$O_{2Tank} = (W_{Amb} * O_{2Amb}) + (W_{NEA} * O_{2NEA}) \qquad \text{Equation 4.}$$

Where O2tank is oxygen within the fuel tank, Wamb is flow of air through the vent, O2amb is oxygen from flow through the vent, Wnea is the flow of nitrogen-enriched air, and O2nea is the oxygen contained in the nitrogen-enriched air. Substituting equation 3 for total flow, into Equation 4 provides the relationship that provides the amount of oxygen within the fuel tank 18 for a given pressure and flow. The relationship of oxygen within the fuel tank 18 is provided by Equation 5 below $$O_{2Tank} = \left[ \frac{P * (VOL)}{\gamma * T * R} * O_{2NEA} \right] + (W_{NEA} * O_{2NEA}). \qquad \text{Equation 5}$$

Utilizing known relationships between pressure, temperature and flow rates for the air separation module 12 provides a relationship that represents the amount of oxygen content as related to the rate of the nitrogen-enriched air stream 16. The relationship is represented by Equation 6 below.

$$O_{2NEA} = K * W^2_{NEA} \qquad \text{Equation 6.}$$

Where K is a coefficient or group of coefficients relating to operation of the air separation module 12. Knowledge of oxygen concentration within the nitrogen-enriched air stream 16 provided by the air separation module 12 combined with knowledge of oxygen content within the fuel tank 18 provides a relationship for oxygen content within the fuel tank 18 related to flow from the air separation module 12. Equation 7 below can represent this relationship.

$$O_{2Tank} = \frac{PVO_{2AMB}}{\gamma RT} + O_{2AMB} * W_{NEA} + KW_{NEA}^2.\qquad \text{Equation 7}$$

The controller 30 utilizes these relationships to determine a desired flow rate that minimizes changes to the oxygen concentration within the fuel tank 18. The flow rate that provides the minimal changes in oxygen concentration is represented by the relationship shown in Equation 8 below.

$$W_{NEA} = \frac{-O_{2AMB}}{2K}.\qquad \text{Equation 8}$$

The controller 30 utilizes this relationship to continually modulate the flow control valve 28 and produce the desired flow rate of nitrogen-enriched air stream 16 through the air separation module 12 that results in the smallest change in oxygen content within the fuel tank 18. The controller 30 utilizes the relationships shown above to derive the command signal to the flow control valve 28. The flow rate into the fuel tank 18 that provides the current ambient pressure is determined. The flow rate through the air separation module 12 for the current conditions that provides the smallest concentration of oxygen is determined and combined with knowledge of the flow rate into the fuel tank 18 that is required to maintain ambient pressure. The controller 30 then commands the flow control valve 28 to provide the flow that minimizes changes in oxygen concentration within the fuel tank 18.

Once the rate of airflow required to minimize oxygen concentration is known, the flow control valve 28 is modulated and the opening 54 adjusted. The controller 30 tailors the flow rate of the nitrogen-enriched air stream 16 responsive to current ambient conditions to minimize oxygen content within the fuel tank 18. Because the nitrogen-enriched air stream 16 is continuously varied according to current conditions, the capacity of the air separation module 12 is more efficiently utilized. More efficient use of air separation module capacity provides for the use of air separation modules of smaller sizes and capacities.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of controlling oxygen content within and aircraft fuel tank ullage, said method comprising the steps of:
   (a) determining a rate of change in oxygen content within the fuel tank ullage based on atmospheric pressure and temperature of an environment outside of the aircraft and external of the fuel tank ullage, wherein the atmospheric pressure and temperature of the environment outside of the aircraft and the fuel tank ullage are measured by sensors disposed outside of the fuel tank ullage;
   (b) determining a desired flow rate of nitrogen-enriched air required to minimize oxygen content within the fuel tank ullage based on the atmospheric pressure and temperature of the environment outside of the aircraft and external to the fuel tank ullage; and
   (c) controlling an actual flow rate of nitrogen-enriched air responsive to said determination of said desired flow rate of nitrogen-enriched air by modulating a control valve disposed between an air separation unit and the fuel tank ullage.

2. The method as recited in claim 1, wherein said step (b) includes determining a total flow rate required to maintain a desired pressure within the fuel tank.

3. The method as recited in claim 2, wherein said step (b) includes determining a relationship between oxygen content and a flow rate of nitrogen-enriched air.

4. The method as recited in claim 1, including the step of continuously reevaluating said desired flow rate of nitrogen-enriched air responsive to ambient conditions.

5. The method as recited in claim 4, including the step of continuously adjusting the actual flow rate of nitrogen-enriched air based on the reevaluation of said desired flow rate.

6. The method as recited in claim 1, including the step of removing oxygen from an air stream with an air separation module.

7. The method as recited in claim 6, including generating a low pressure area at a permeate outlet of the air separation module by ejecting high pressure air through an ejector adjacent the permeate outlet of the air separation module.

8. The method as recited in claim 1, wherein the control valve comprises a continuously variable orifice driven by an electric motor responsive to signals from a controller.

9. A method of controlling oxygen content within an aircraft fuel tank comprising the steps of:
   (a) measuring an atmospheric temperature and pressure of an environment outside of the aircraft and the aircraft fuel tank;
   (b) determining a flow rate of gases into the aircraft fuel tank through a vent to the environment outside of the aircraft fuel tank utilizing the measured atmospheric temperature and pressure;
   (c) determining a flow rate of nitrogen-enriched air into the aircraft fuel tank from an air separation unit utilizing the measured atmospheric temperature and pressure; and
   (d) adjusting a control valve between the air separation unit and the fuel tank to control a flow rate of nitrogen-enriched gases into the aircraft fuel tank from the air separation unit to minimize an oxygen content within the fuel tank based on the measured atmospheric temperature and pressure outside the aircraft and the aircraft fuel tank.

10. The method as recited in claim 9, wherein said step (c) includes the step of determining an oxygen concentration within the nitrogen-enriched air stream based on the flow rate of nitrogen-enriched air at the measured atmospheric temperature and pressure outside of the aircraft and aircraft fuel tank.

11. The method as recited in claim 10, including the step of determining an oxygen content within the aircraft fuel tank based on the determined oxygen content within the nitrogen-enriched air stream and the flow rate of gases into the aircraft fuel tank through the vent based on the measured atmospheric temperature and pressure of the environment outside of the aircraft and the aircraft fuel tank.

12. The method as recited in claim 9, including the step of determining a flow rate into the aircraft fuel tank through the vent and from the air separation unit that provides a pressure equal to a measured atmospheric pressure outside of the aircraft and aircraft fuel tank, determining a flow rate from the air separation unit that minimizes oxygen content within the nitrogen-enriched gases, and modulating the control valve to adjust the actual flow rate from the air separation unit with the determined flow rate that minimizes oxygen content within the nitrogen-enriched gases.

13. The method as recited in claim 9, wherein the control valve comprises an electric motor moving a valve plate responsive to controls from a controller, wherein the step of adjusting the control valve comprises the steps of controlling the electric motor with the controller to control the flow rate of nitrogen-enriched gases according to the determined flow rate.

* * * * *

UNITED STATES PATENT AND TRADEMARK OFFICE
CERTIFICATE OF CORRECTION

PATENT NO. : 7,509,968 B2 Page 1 of 1
APPLICATION NO. : 10/901468
DATED : March 31, 2009
INVENTOR(S) : Surawski It is certified that error appears in the above-identified patent and that said Letters Patent is hereby corrected as shown below:

IN THE CLAIMS:

Claim 1, Column 5, Line 54: Change "and" to "an"

Signed and Sealed this

Thirtieth Day of June, 2009

JOHN DOLL
*Acting Director of the United States Patent and Trademark Office*